(12) United States Patent
Easterday, III

(10) Patent No.: US 8,932,161 B2
(45) Date of Patent: Jan. 13, 2015

(54) VARIABLE SPEED ALTERNATOR

(75) Inventor: Lawrence J. Easterday, III, Goodrich, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 232 days.

(21) Appl. No.: 13/588,032

(22) Filed: Aug. 17, 2012

(65) Prior Publication Data

US 2013/0065717 A1 Mar. 14, 2013

Related U.S. Application Data

(60) Provisional application No. 61/532,725, filed on Sep. 9, 2011.

(51) Int. Cl.
 *F16H 9/02* (2006.01)
 *F16H 55/00* (2006.01)
 *F16H 55/54* (2006.01)

(52) U.S. Cl.
 CPC .................................... *F16H 55/54* (2013.01)
 USPC ............................................. 474/49; 474/47

(58) Field of Classification Search
 CPC ............ F16H 9/10; F16H 55/54; F16H 55/56
 USPC ................................. 474/47, 49, 50
 See application file for complete search history.

(56) References Cited

U.S. PATENT DOCUMENTS

| | | | | |
|---|---|---|---|---|
| 134,061 A | * | 12/1872 | Hummer et al. | 474/49 |
| 1,198,451 A | * | 9/1916 | Juarez | 474/54 |
| 2,266,538 A | * | 12/1941 | Evans | 112/470.32 |
| 4,179,946 A | | 12/1979 | Kanstoroom | |
| 4,498,351 A | * | 2/1985 | Ahoor | 74/439 |
| 4,539,000 A | * | 9/1985 | Gayer | 474/13 |
| 4,617,005 A | | 10/1986 | Jaccod et al. | |
| 4,810,234 A | * | 3/1989 | Kumm | 474/49 |
| 4,832,661 A | * | 5/1989 | Wagner et al. | 474/69 |
| 4,952,196 A | * | 8/1990 | Chilcote et al. | 474/70 |
| 4,973,289 A | * | 11/1990 | Leonard | 474/49 |
| 5,492,506 A | * | 2/1996 | Lorance | 474/49 |
| 5,709,624 A | | 1/1998 | Donowski | |
| 5,827,143 A | * | 10/1998 | Monahan et al. | 474/73 |
| 6,001,042 A | | 12/1999 | Raney | |
| 6,129,643 A | | 10/2000 | Tamagawa et al. | |
| 6,152,844 A | * | 11/2000 | Daugherty | 474/49 |
| 6,406,390 B1 | | 6/2002 | Roby | |
| 7,156,764 B2 | * | 1/2007 | Mercat et al. | 474/47 |
| 7,955,203 B2 | * | 6/2011 | Siman-Tov | 474/47 |
| 2001/0049312 A1 | * | 12/2001 | Warner et al. | 474/18 |
| 2007/0054766 A1 | * | 3/2007 | Shamis et al. | 474/47 |
| 2008/0108464 A1 | * | 5/2008 | Gajewski et al. | 474/49 |
| 2011/0004373 A1 | * | 1/2011 | Bacon | 701/36 |
| 2011/0045928 A1 | * | 2/2011 | Wong et al. | 474/47 |

* cited by examiner

*Primary Examiner* — William E Dondero
*Assistant Examiner* — Minh Truong
(74) *Attorney, Agent, or Firm* — Ralph E Smith

(57) ABSTRACT

A variable speed alternator can include a shaft and adjustable pulley assembly coupled to the shaft. The adjustable pulley assembly can include a support member fixed to the shaft and an adjustable pulley moveably coupled to the support member. The adjustable pulley can have a plurality of individually moveable members each with an outer surface forming a portion of a belt engaging surface for receiving a flat belt to drive the adjustable pulley. Each moveable member can be selectively linearly moveable in a radial direction to vary an outer diameter of the adjustable pulley between a first position having a first outer diameter and a second position having a second outer diameter to selectively vary a driven speed of the alternator shaft.

18 Claims, 5 Drawing Sheets

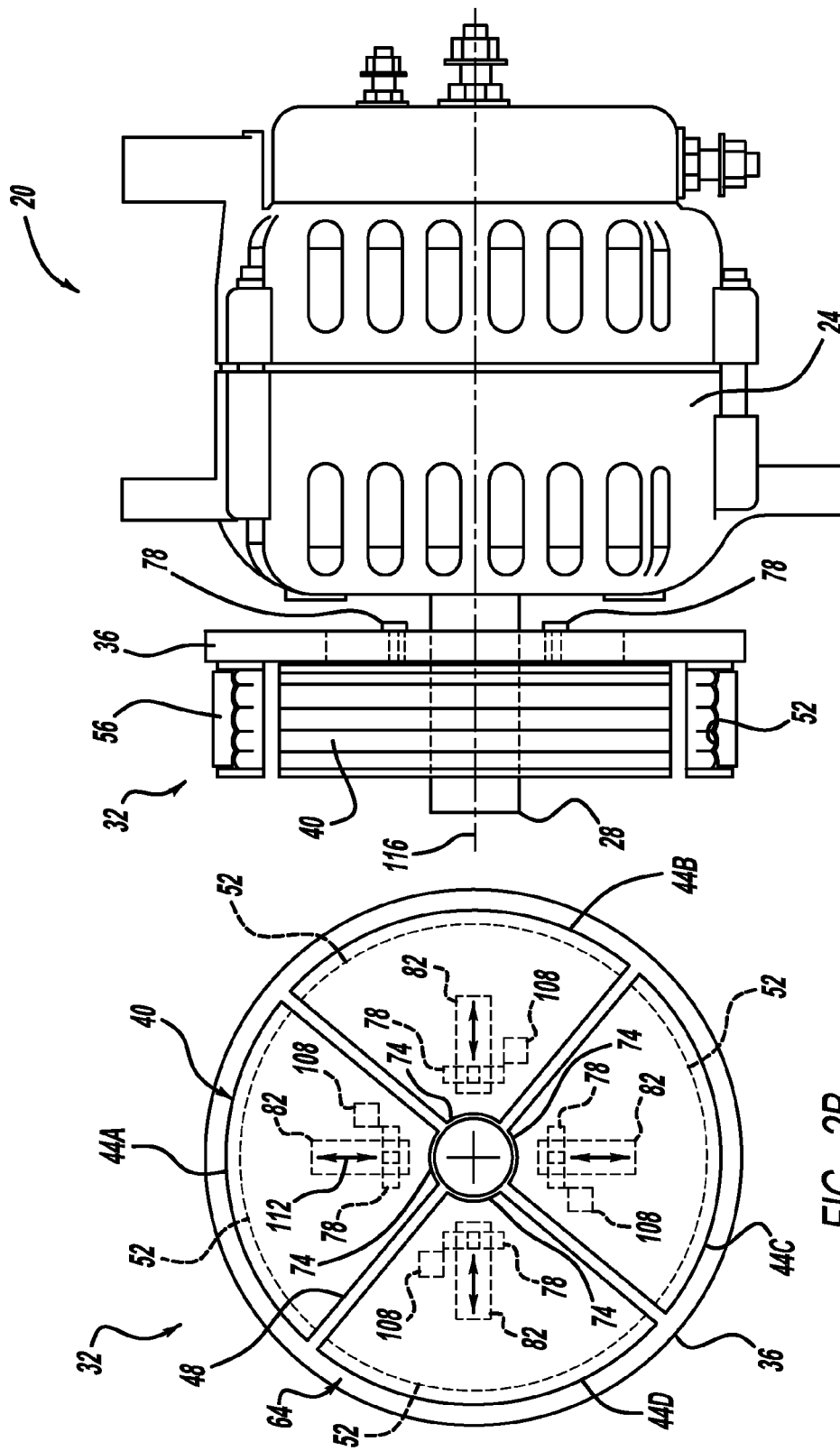

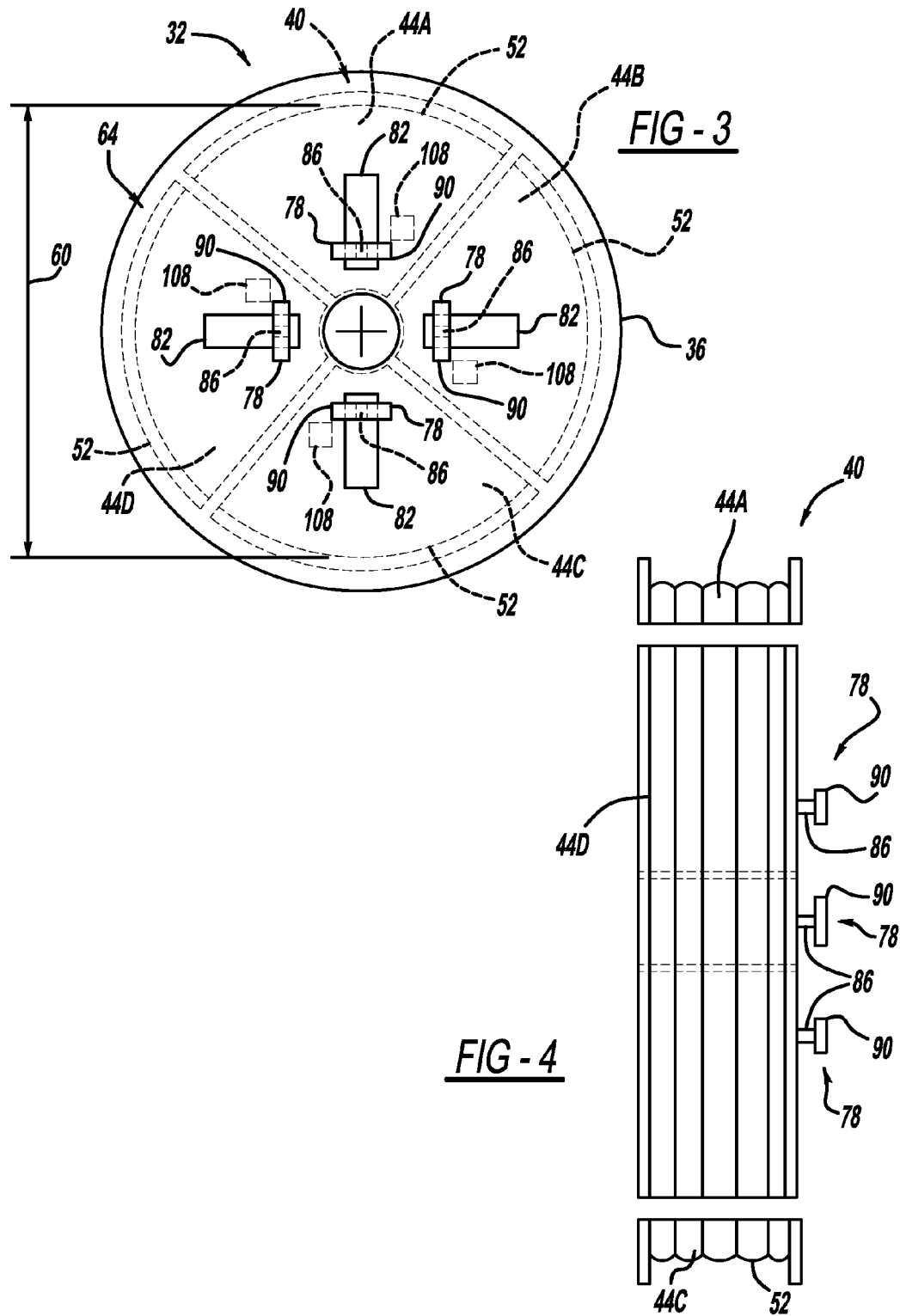

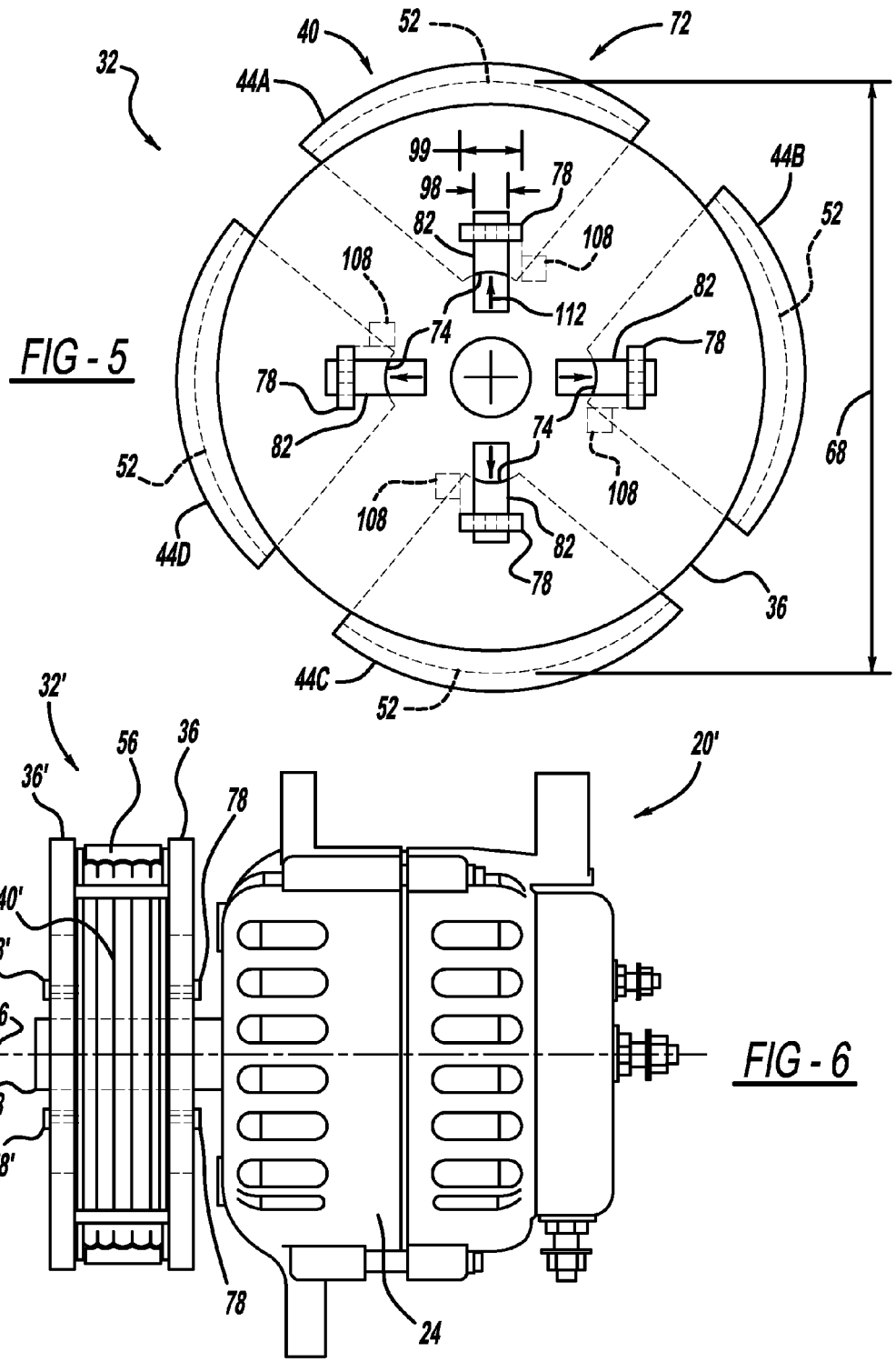

VARIABLE SPEED ALTERNATOR

CROSS-REFERENCE TO RELATED APPLICATION

This application claims the benefit of U.S. Provisional Application No. 61/532,725, filed Sep. 9, 2011.

FIELD

The present disclosure relates generally to an alternator, and more particularly to a variable speed alternator having an adjustable pulley.

BACKGROUND

Alternators are used in modern automotive vehicles to charge the battery and power the electrical system when the vehicle is running. Alternators are typically part of a front end accessory drive system of the vehicle and are often driven by a crankshaft of an associated engine via a belt. An example of a conventional alternator 10 having a fixed pulley 14 coupled to a shaft 18 is shown in FIG. 1. One recognized drawback of conventional alternators is that their rotational speed is directly proportional to the engine speed. Thus the current output of such alternators varies proportional to engine speed, with the rated maximum current output of the alternator being at a normal operating range of the alternator. Such a normal operating range for a motor vehicle alternator is typically between 2500-3500 engine RPM. Therefore, the current output of a typical automotive alternator is less at an engine idle condition, such as 500-700 RPM, as compared to the normal operating range of the alternator.

As a result, automotive vehicle alternators need to be sized to handle the vehicle's maximum anticipated electrical load or current draw at an engine idle condition. Thus, the alternator's current output at an engine idle condition is often the driving factor in determining an appropriate alternator size (i.e., maximum current output) because the alternator's current output at idle is proportional to its rated output at the normal operating range. One drawback of this alternator sizing approach is that the alternator will typically have a larger current output at the normal operating range than is required to handle the vehicle's electrical load at the normal operating range. Such an alternator sized with this approach can be more expensive due to its larger capacity and, in certain operating ranges, less efficient.

Thus, while known alternators with fixed pulleys work for their intended purpose, there remains a need for continuous improvement in the relevant art.

SUMMARY

In one form, a variable speed alternator is provided in accordance with the teachings of the present disclosure. The variable speed alternator can include a shaft and an adjustable pulley assembly coupled to the shaft. The adjustable pulley assembly can include a support member fixed to the shaft and an adjustable pulley moveably coupled to the support member. The adjustable pulley can have a plurality of individually moveable members each with an outer surface forming a portion of a belt engaging surface for receiving a flat belt to drive the adjustable pulley. Each moveable member can be selectively linearly moveable in a radial direction to vary an outer diameter of the adjustable pulley between a first position having a first outer diameter and a second position having a second outer diameter to selectively vary a driven speed of the alternator shaft.

In another form, a variable speed alternator system for a vehicle having an engine is provided in accordance with the teachings of the present disclosure. The variable speed alternator can include a control arrangement, an alternator shaft and an adjustable pulley assembly. The control arrangement can include a controller operatively coupled to an alternator speed sensor and an engine speed sensor. The adjustable pulley assembly can include a support member, an adjustable pulley and a plurality of actuation members. The support member can be fixed to the alternator shaft and the adjustable pulley can be moveably coupled to the support member. The adjustable pulley can have a plurality of individually moveable members, and the plurality of actuation members can each be operatively associated with the controller and coupled to a respective one of the plurality of moveable members and the support member. Each moveable member can include an outer arcuate surface forming a portion of a belt engaging surface for receiving a flat belt to drive the adjustable pulley. The controller can be configured to cause the plurality of actuation members to selectively linearly translate the plurality of moveable members in a radial direction to vary an outer diameter of the adjustable pulley between an unexpanded state having a first outer diameter and an expanded state having a second outer diameter to selectively vary a driven speed of the alternator shaft.

Further areas of applicability of the present disclosure will become apparent from the detailed description, drawings and claims provided hereinafter. It should be understood that the detailed description, including disclosed embodiments and drawings, are merely exemplary in nature, intended for purposes of illustration only, and are not intended to limit the scope of the invention, its application, or use. Thus, variations that do not depart from the gist of the invention are intended to be within the scope of the invention.

DRAWINGS

FIG. 2A is a side view of an exemplary variable speed alternator having an adjustable pulley assembly in accordance with the teachings of the present disclosure;

FIG. 2B is a front view of the adjustable pulley assembly of FIG. 2A with the adjustable pulley in an unexpanded state in accordance with the teachings of the present disclosure;

FIG. 3 is a rear view of the adjustable pulley assembly of FIG. 2B with the adjustable pulley in an unexpanded state in accordance with the teachings of the present disclosure;

FIG. 4 is a side view of the adjustable pulley assembly of FIG. 2A with a support member removed in accordance with the teachings of the present disclosure;

FIG. 5 is a rear view of the adjustable pulley assembly with the adjustable pulley in an expanded state in accordance with the teachings of the present disclosure;

FIG. 6 is a side view of an exemplary alternative variable speed alternator including an adjustable pulley assembly with two support members in accordance with the teachings of the present disclosure.

DETAILED DESCRIPTION

Figure 1:
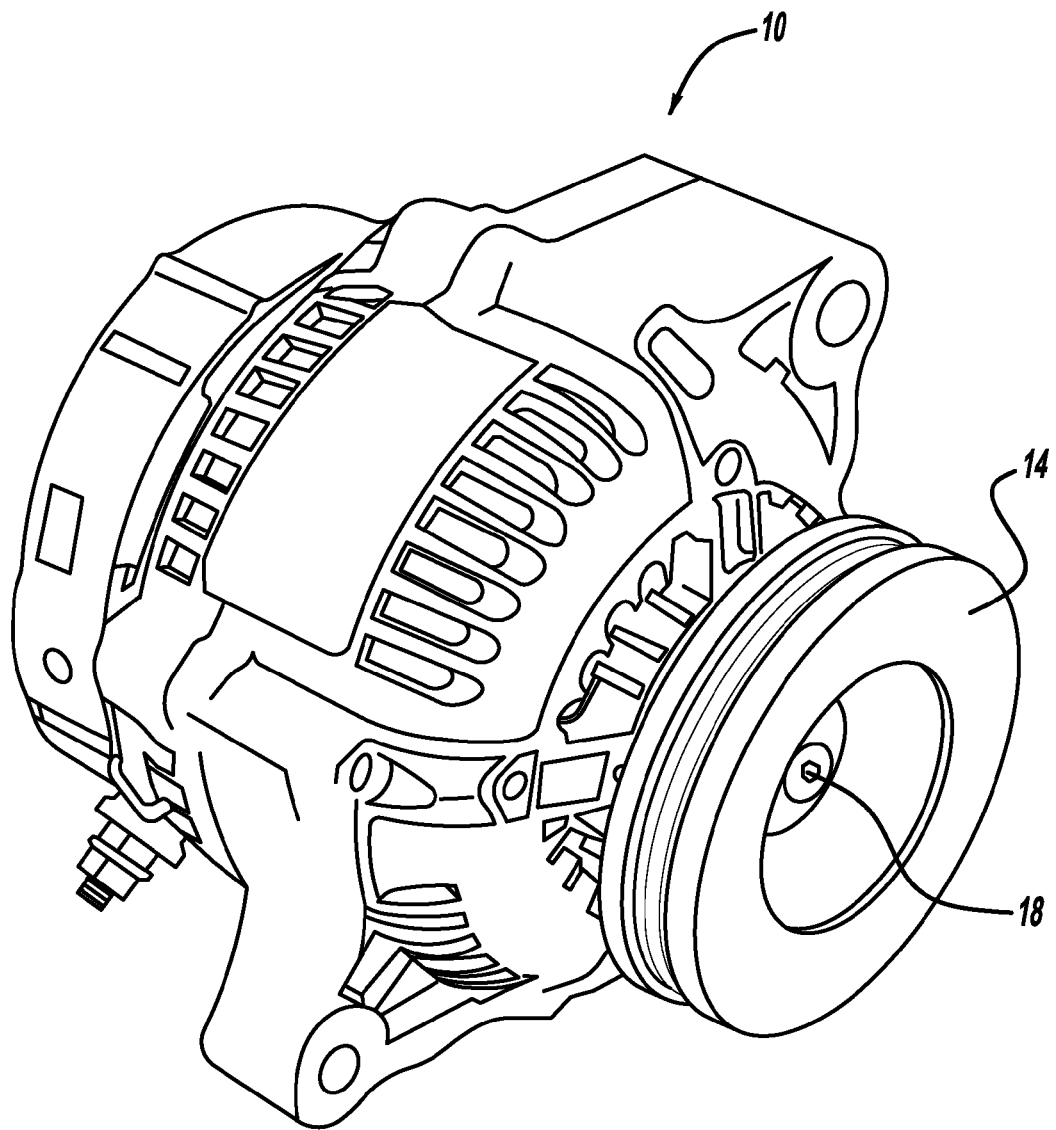
FIG. 1 is a perspective view of an exemplary conventional fixed pulley alternator.

With initial reference to FIG. 1, the exemplary conventional alternator 10 includes fixed pulley 14 that rotates shaft 18 at a speed proportional to a speed of a crankshaft pulley of an associated engine, as is known in the art. The fixed pulley 14 is not adjustable such that it has a fixed ratio of, for example, 3:1 relative to the crankshaft pulley, and is not capable of varying a rotational speed of the alternator relative to a given belt speed or crankshaft speed. In example embodiments that follow, well-known alternator device structures and technologies, such as an alternator body, rotor and stator will not be described in further detail.

Turning now to FIGS. 2-5, a variable speed alternator 20 is provided in accordance with the teachings of the present disclosure. As will be discussed in greater detail below, variable speed alternator 20 can selectively vary a diameter of an associated pulley to increase a ratio of an alternator pulley diameter to a crankshaft pulley diameter at an engine idle condition so as to increase the speed of the alternator at the idle condition. Variable speed alternator 20 can also selectively decrease the ratio at a non-idle condition of the engine so as to not over speed the alternator at a normal operating speed of the engine (not shown). Such selective variation of the adjustable pulley diameter provides the ability to use a smaller size or capacity alternator (i.e., lower maximum current output), which can result in the ability to use a lower cost and more efficient alternator for a given vehicle application.

Alternator 20 includes a body or housing 24, a shaft 28, and an adjustable pulley assembly 32 coupled to shaft 28, as shown for example in FIG. 2A. Adjustable pulley assembly 32 can include a support member 36 fixedly coupled to shaft 28 and an adjustable pulley 40 movably coupled to support member 36. In one exemplary aspect, adjustable pulley 40 includes four moveable members 44A-44D each individually coupled to support member 36. Each movable member 44A-44D can include a wedge or pie shaped configuration 48, as shown in FIG. 2B, and can be translated in a linear, radial direction to vary an outer diameter of pulley 40, as will be discussed herein. It should be appreciated that while the discussion will continue with reference to four moveable members, more or less moveable members are envisioned for use in forming adjustable pulley 40.

Movable members 44A-44D each include an outer arcuate surface 52 configured to receive a serpentine or other flat accessory drive belt 56, as shown in FIGS. 2A and 2B. The outer arcuate surfaces 52 are sized and shaped to form a substantially continuous first outer diameter 60 in a first position, such as in an unexpanded state 64, and a second outer diameter 68 in a second position, such as in a fully expanded state 72, as shown for example in FIGS. 3 and 5. It should be appreciated that moveable members 44A-44D can be selectively radially expanded and contracted in various positions intermediate the first and second outer diameters 60, 68 to form various intermediate diameters and corresponding pulley ratios relative to the crankshaft pulley (not shown). Each moveable member 44A-44D can also include an arcuate inner surface 74 sized and shaped to matingly engage shaft 28 when members 44A-44D are in the unexpanded state 64, as shown in FIG. 2B.

The moveable members 44A-44D each include at least one connecting member 78 for moveably coupling each movable member to the support member 36, as shown in FIGS. 3 and 4. In one exemplary aspect, each connecting member 78 is received in a corresponding slot or channel 82 in support member 36. Each channel 82 is circumferentially spaced around support member 36 so as to align with each corresponding connecting member 78. In one exemplary aspect, the channels 82 can be circumferentially spaced ninety degrees apart, as shown for example in FIG. 3. Each connecting member 78 can include a post member 86 and a retaining member 90 sized and shaped to have a width 99 greater than a width 98 of channel 82, as shown for example in FIG. 5. The channels 82 can include a predetermined longitudinal length configured to define a linear, radial range of motion of each movable member 44A-44D, as will be discussed in greater detail below.

It should be appreciated that while each moveable member 44A-44D has been discussed and illustrated as having one connecting member 78, it is contemplated herein that each movable member 44A-44D can include multiple connecting members 78, such as two connection members, to provide additional retention and alignment capabilities.

Adjustable pulley assembly 32 includes a plurality of actuation members 108, one for each moveable member 44A-44D. In one exemplary aspect, each actuation member 108 can be coupled to support member 36 and a respective moveable member 44A-44D, such as via connecting member 78. Each actuation member 108 is configured to selectively translate a respective moveable member 44A-44D in a linear, radial direction 112, as shown for example in FIGS. 2B and 5. In one exemplary aspect, the radial direction 112 can be perpendicular to a longitudinal centerline 116 of the alternator shaft 28.

Actuation members 108 can include any electromechanical actuator suitable for receiving a signal from a control device and translating the respective moveable member 44A-44D accordingly. In one exemplary aspect, actuation members 108 are linear electromechanical actuators (LEMAs), such as linear solenoids having a coil and plunger for converting electrical energy to linear motion. The electromechanical actuators 108 are coupled to a controller, as will be discussed in greater detail below. In another exemplary aspect, a linear variable differential transducer (LVDT) can be coupled to the actuation members 108 to provide feedback regarding an amount of linear displacement of the connecting members 78 by the actuation members 108. The actuation members 108 can be calibrated and/or appropriately sized to limit an amount of linear displacement to a length of the channels 82 in the radial direction 112.

With continuing reference to FIG. 6, an alternative variable speed alternator 20' is shown in accordance with the teachings of the present disclosure, where like reference numerals refer to like components previously introduced. Variable speed alternator 20' is substantially similar to variable speed alternator 20 such that only differences between alternators 20 and 20' will now be discussed. Alternator 20' includes an adjustable pulley assembly 32' that includes an additional support member 36' fixed to shaft 28 about a front side of an adjustable pulley 40'. Each moveable member 44A-44D of adjustable pulley 40' is additionally coupled to support member 36' using connecting members 78' in the same manner as discussed above with respect to support member 36, as shown for example in FIG. 6.

It should be appreciated that adjustable pulley 40' can be moveably coupled to shaft 28 using one or both of support members 36, 36', including only support member 36 or only support member 36'. Actuation members 108 can likewise be coupled to either of support members 36, 36' if both are used, and to one of support members 36, 36' if only one support member is used.

Figure 7:
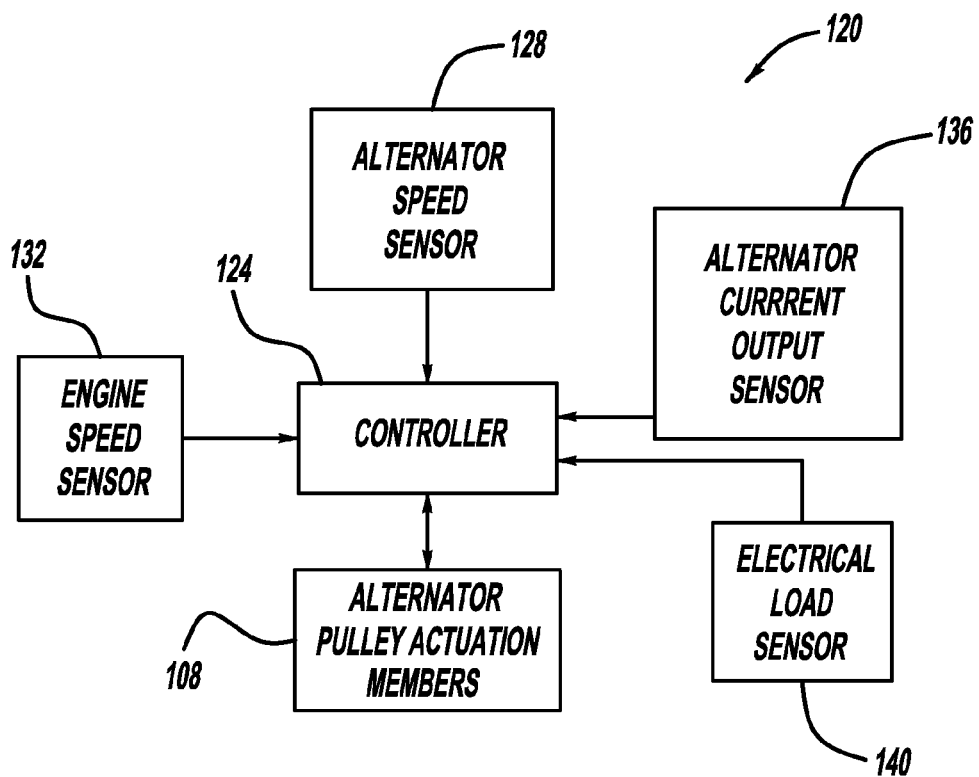
FIG. 7 is a schematic representation of a control arrangement operatively associated with the variable speed alternator in accordance with the teachings of the present disclosure.

With additional reference to FIG. 7, a control arrangement 120 operatively associated with variable speed alternator 20, 20' will now be discussed in connection with operation of the variable speed alternator 20, 20' and adjustable pulley assembly 32, 32'. Control arrangement 120 includes a controller 124 operatively coupled to at least an alternator speed sensor 128, an engine speed sensor 132, an alternator current output sensor 136, an electrical load sensor 140, and the alternator actuation members 108. Controller 124 can be a dedicated controller for variable speed alternator 20, 20', or can be incorporated into another vehicle controller, such as an engine or powertrain controller.

Engine speed sensor 132 and alternator speed sensor 128 are configured to sense respective rotational speeds of the engine and alternator and communicate the respective speeds to controller 124, as is known in the art. Alternator current output sensor 136 is configured to sense a current output of alternator 20, 20' and communicate the sensed current output to controller 124, and the electrical load sensor is configured to sense a current electrical load demand from electrical components of an associated vehicle, as is also known in the art.

Controller 124 is configured to selectively vary a diameter of the adjustable pulley 40 to selectively increase or decrease a rotational speed of shaft 28 relative to the belt speed or crankshaft speed, as will be discussed in greater detail below. In one exemplary aspect, controller 124 is configured to sense when the engine is at an idle speed condition based on input from engine speed sensor 132 and decrease a diameter of adjustable pulley 40 from the expanded state 72 to the unexpanded state 64 to increase a speed of the alternator shaft 28 relative to the crankshaft speed. In this regard, controller 124 sends a signal to each of the actuator members 108 to move the connecting members 78 of moveable members 44A-44D in the linear radial direction 112 toward shaft 28 to the unexpanded state 64. The increased speed of the alternator at the engine idle condition relative to the crankshaft speed can increase the current output of the alternator to its maximum rated current output.

It should be appreciated that controller 124 can also be configured to reduce a diameter of pulley 40 from the expanded state 72 to a diameter intermediate the expanded state 72 and the unexpanded state 64. For example, controller 124 can reduce the diameter of pulley 40 from the expanded state 72 to the intermediate diameter in response to input from the engine speed sensor 132 indicating the engine is at a speed between idle and the normal operating range. Controller 124 can also reduce the diameter of pulley 40 to such an intermediate diameter if the sensed electrical load from electrical load sensor 140 does not require alternator 20, 20' to be driven at a speed produced by the pulley diameter being reduced to the unexpanded state 64.

Controller 124 is also configured to increase a diameter of adjustable pulley 40 from the unexpanded state 64 to the expanded state 72 in response to input from engine speed sensor 132 that the engine is operating at the normal operating range so as to not over speed the alternator shaft 28. In this regard, it should be appreciated that increasing a diameter of the adjustable pulley 40 decreases a ratio of the adjustable pulley diameter to the crankshaft pulley diameter and thus the speed of the alternator shaft 28 relative to the engine or crankshaft speed.

Controller arrangement 120 can also be configured to selectively vary the diameter of adjustable pulley 40 in response to sensed differences in a change in speed of the crankshaft as compared to a corresponding change in speed of the alternator shaft 28. If the deceleration of the alternator shaft 28 does not match the deceleration of the engine crankshaft during an engine deceleration event, then the accessory drive belt 56 may temporarily exhibit slack which can exhibit noise and/or a slap condition when the slack is removed. In this regard, controller 124 can determine a change in deceleration of the crankshaft compared to a change in deceleration of the alternator shaft by comparing changes in speed of the respective components via engine speed sensor 132 and alternator speed sensor 128, respectively. If the determined deceleration of the alternator shaft 28 does not match the determined deceleration of the engine, then controller 124 can vary the diameter of adjustable pulley 40 to increase or decrease a speed of alternator shaft 28 such that the deceleration of alternator shaft 28 matches that of the engine based on input from engine speed sensor 132 and alternator speed sensor 128.

The variable speed alternator 20, 20' having the adjustable pulley assembly 32, 32' and associated control arrangement provides the opportunity to use a smaller sized alternator (i.e., a lower rated current output at normal operating range) while also being able to handle worst case vehicle current draw at an engine idle condition. Such a smaller alternator can provide cost and efficiency improvements over existing vehicle alternators, as well as potential fuel economy improvements due to the alternator's improved efficiency and smaller capacity.

What is claimed is:

1. A variable speed alternator system for a vehicle having an engine, the variable speed alternator system comprising:
   a control arrangement including a controller operatively coupled to an alternator speed sensor and an engine speed sensor;
   an alternator shaft; and
   an adjustable pulley assembly coupled to the alternator shaft, the pulley assembly including:
      a support member fixed to the alternator shaft; and
      an adjustable pulley moveably coupled to the support member, the adjustable pulley having a plurality of individually moveable members; and
      a plurality of actuation members each coupled to a respective one of the plurality of moveable members and the support member, each actuation member operatively associated with the controller;
   wherein each moveable member includes an arcuate shaped outer surface forming a portion of a belt engaging surface for receiving a flat belt to drive the adjustable pulley; and
   wherein the controller is configured to cause the plurality of actuation members to selectively linearly translate the plurality of moveable members in a radial direction to vary an outer diameter of the adjustable pulley between an unexpanded state having a first outer diameter and an expanded state having a second outer diameter to selectively vary a driven speed of the alternator shaft in response to an output of at least one of the alternator speed sensor and the engine speed sensor; and wherein the plurality of moveable members each extend radially between the arcuate shaped outer surface and an arcuate shaped inner surface, the arcuate shaped outer surface of each moveable member extending circumferentially to form the outer diameter with the arcuate shaped outer surfaces of adjacent moveable members when the moveable members are arranged in the first position and the arcuate shaped inner surface of each moveable member extending circumferentially to form an inner diameter with the arcuate shaped inner surfaces of adjacent moveable members when the moveable members are arranged in the first position such that the arcuate shaped inner surfaces of the moveable members circumscribe and directly engage the alternator shaft when the moveable members are arranged in the first position.

2. The system of claim 1, wherein the plurality of moveable members includes four moveable members and the plurality of actuation members includes four actuation members, and wherein the outer surface of each of the four moveable members extends ninety degrees circumferentially.

3. The system of claim 1, wherein the actuation members include linear electromechanical actuators.

4. The system of claim 1, wherein the each moveable member includes a connecting member, and wherein the support member includes a plurality of radially extending channels each configured to receive one of the connection members to rotationally fix the moveable members to the support member while allowing radial movement of moveable members relative to the support member.

5. The system of claim 4, wherein the channels extend linearly in the radial direction and are sized and shaped to limit a radial range of motion of the moveable members so as to define the first and second outer diameters of the adjustable pulley in the respective expanded and unexpanded states, the first diameter being smaller than the second diameter.

6. The system of claim 1, wherein the controller is configured to cause the actuation members to position the moveable members of the adjustable pulley in the unexpanded state having the first diameter to increase a current output of the alternator in response to a signal from the engine speed sensor indicating the engine is at an idle condition.

7. The system of claim 1, wherein the controller is configured to cause the actuation members to position the moveable members of the adjustable pulley in the expanded state having the second diameter to decrease a driven speed of the alternator shaft in response to a signal from the engine speed sensor indicating the engine is at a non-idle condition and in response to input from the alternator speed sensor.

8. The system of claim 1, further comprising an electrical load sensor operatively associated with the controller and configured to sense a current electrical load of the vehicle;
wherein the controller is configured to cause the actuation members to position the moveable members of the adjustable pulley in the unexpanded state having the first diameter to increase a current output of the alternator in response to a signal from the engine speed sensor indicating the engine is at an idle condition and in response to input from the electrical load sensor.

9. A variable speed alternator, comprising;
an alternator shaft; and
an adjustable pulley assembly coupled to the alternator shaft, the pulley assembly including:
a support member fixed to the alternator shaft and having an outer diameter;
an adjustable pulley moveably coupled to the support member, the adjustable pulley having a plurality of individually moveable members each with an arcuate shaped outer surface forming a portion of a belt engaging surface for receiving a flat belt to drive the adjustable pulley, each moveable member being selectively linearly moveable in a radial direction to vary an outer diameter of the adjustable pulley between a first position having a first outer diameter and a second position having a second outer diameter to selectively vary a driven speed of the alternator shaft;
wherein the first outer diameter of the adjustable pulley is smaller than the second outer diameter of the adjustable pulley, the first outer diameter of the adjustable pulley being smaller than the outer diameter of the support member and the second outer diameter of the adjustable pulley being larger than the outer diameter of the support member; and wherein the plurality of moveable members each extend radially between the arcuate shaped outer surface and an arcuate shaped inner surface, the arcuate shaped outer surface of each moveable member extending circumferentially to form the outer diameter with the arcuate shaped outer surfaces of adjacent moveable members when the moveable members are arranged in the first position and the arcuate shaped inner surface of each moveable member extending circumferentially to form an inner diameter with the arcuate shaped inner surfaces of adjacent moveable members when the moveable members are arranged in the first position such that the arcuate shaped inner surfaces of the moveable members circumscribe and directly engage the alternator shaft when the moveable members are arranged in the first position.

10. The variable speed alternator of claim 9, further comprising a plurality of actuation members, wherein each of the plurality of actuation members is coupled to one of the plurality of moveable members and the support member, the plurality of actuation members being configured to selectively linearly move the corresponding plurality of moveable members relative to the support member.

11. The variable speed alternator of claim 10, wherein each moveable member of the adjustable pulley includes a connecting member for moveably coupling each moveable member to the support member.

12. The variable speed alternator of claim 11, wherein the support member includes a plurality of radially extending channels each configured to receive one of the connecting members to moveable couple the moveable members to the support member.

13. The variable speed alternator of claim 12, wherein the channels extend linearly in the radial direction and are sized and shaped to limit a radial range of motion of the moveable members so as to define the first and second outer diameters of the adjustable pulley.

14. The variable speed alternator of claim 10, wherein the actuation members include electromechanical actuation members.

15. The variable speed alternator of claim 10, wherein the actuation members are linear solenoids.

16. The variable speed alternator of claim 9, wherein the plurality of moveable members each extend radially in a wedge shaped configuration that is substantially parallel to the support member and a plurality of actuation members are disposed axially between the plurality of moveable members on one side and the support member on another side.

17. The variable speed alternator of claim 9, wherein the support member includes a first support member and a second support member spaced apart from each other and fixed to the alternator shaft, the plurality of moveably members of the adjustable pulley positioned between the first and second support members and each moveably coupled to both the first and second support members.

18. The variable speed alternator of claim 9, wherein the first position comprises an unexpanded state and the second position comprises an expanded state of the adjustable pulley.

* * * * *